(12) United States Patent
Zhu

(10) Patent No.: US 11,849,486 B2
(45) Date of Patent: Dec. 19, 2023

(54) CHANNEL DETECTION METHOD AND APPARATUS

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 151 days.

(21) Appl. No.: 17/420,192

(22) PCT Filed: Jan. 3, 2019

(86) PCT No.: PCT/CN2019/070182
§ 371 (c)(1),
(2) Date: Jul. 1, 2021

(87) PCT Pub. No.: WO2020/140224
PCT Pub. Date: Jul. 9, 2020

(65) Prior Publication Data
US 2022/0070933 A1    Mar. 3, 2022

(51) Int. Cl.
*H04W 74/08* (2009.01)

(52) U.S. Cl.
CPC ... *H04W 74/0816* (2013.01); *H04W 74/0825* (2013.01); *H04W 74/0866* (2013.01)

(58) Field of Classification Search
CPC ......... H04W 74/0866; H04W 74/0825; H04W 74/0816
See application file for complete search history.

(56) References Cited

U.S. PATENT DOCUMENTS

| | | | |
|---|---|---|---|
| 10,893,541 B2* | 1/2021 | You | H04W 74/0833 |
| 2017/0048880 A1 | 2/2017 | Anderson et al. | |
| 2018/0332579 A1 | 11/2018 | Kang et al. | |

(Continued)

FOREIGN PATENT DOCUMENTS

| | | |
|---|---|---|
| CN | 102833804 A | 12/2012 |
| CN | 104333873 A | 2/2015 |

(Continued)

OTHER PUBLICATIONS

State Intellectual Property Office of the People's Republic of China, Office Action and Search Report Issued in Application No. 2019800002116, dated Oct. 21, 2022, 18 pages.

(Continued)

*Primary Examiner* — James P Duffy
(74) *Attorney, Agent, or Firm* — SYNCODA LLC; Feng Ma

(57) ABSTRACT

A channel detection method can be applied to a base station operating on an unlicensed spectrum, and include: detecting that a first uplink transmission is not successfully performed; determining a target channel detection mechanism for performing channel detection for a first downlink transmission, wherein the first downlink transmission represents a next downlink transmission following the first uplink transmission; and performing the channel detection for the first downlink transmission based on the target channel detection mechanism. Therefore, it can be specifically selected that which channel detection mechanism to use according to actual conditions, thereby improving the accuracy and efficiency of channel detection.

12 Claims, 7 Drawing Sheets

(56) References Cited

U.S. PATENT DOCUMENTS

| | | | |
|---|---|---|---|
| 2018/0352573 A1 | 12/2018 | Yang et al. | |
| 2019/0014596 A1* | 1/2019 | Yang | H04W 72/21 |
| 2020/0275490 A1* | 8/2020 | Li | H04L 1/1812 |

FOREIGN PATENT DOCUMENTS

| | | | |
|---|---|---|---|
| CN | 104717687 | A | 6/2015 |
| CN | 105682232 | A | 6/2016 |
| CN | 106559795 | A | 4/2017 |
| CN | 106559882 | A | 4/2017 |
| CN | 106851839 | A | 6/2017 |
| CN | 106993334 | A | 7/2017 |
| CN | 107371274 | A | 11/2017 |
| CN | 107612643 | A | 1/2018 |
| CN | 107949067 | A | 4/2018 |
| CN | 108432152 | A | 8/2018 |
| CN | 108496390 | A | 9/2018 |
| CN | 108684077 | A | 10/2018 |
| JP | 2018088708 | A | 6/2018 |
| WO | 2016119142 | A1 | 8/2016 |
| WO | 2017050282 | A1 | 3/2017 |
| WO | 2017128955 | A1 | 8/2017 |
| WO | 2017136458 | A2 | 8/2017 |
| WO | 2020088775 | A1 | 5/2020 |

OTHER PUBLICATIONS

Intellectual property India, Office Action Issued in Application No. 202147034730, dated Mar. 14, 2022, 7 pages.

European Patent Office, Extended European Search Report Issued in Application No. 19906635.8, dated Dec. 22, 2021, Germany, 9 pages.

ISA State Intellectual Property Office of the People's Republic of China, Written Opinion of the International Searching Authority Issued in Application No. PCT/CN2019/070182, dated Sep. 25, 2019, WIPO, 9 pages.

ISA State Intellectual Property Office of the People's Republic of China, International Search Report Issued in Application No. PCT/CN2019/070182, dated Sep. 25, 2019, WIPO, 4 pages.

State Intellectual Property Office of the People's Republic of China, Office Action and Search Report Issued in Application No. 201980000211.6, dated May 4, 2023, 15 pages.

Ericsson, "On UL Channel Access Procedures for Enhanced LAA," 3GPP TSG RAN WG1 Meeting #84,R1-161001,St. Julian's, Malta, Feb. 15-19, 2016,8 pages.

Nokia, Nokia Shanghai Bell,"Channel access and co-existence for NR-U operation", 3GPP TSG RAN WG1 Meeting #95, R1-1812661,Spokane, USA, Nov. 12-16, 2018,8 pages.

China third office action in application No. 201980000211.6, dated Aug. 11, 2023.

\* cited by examiner

CHANNEL DETECTION METHOD AND APPARATUS

CROSS-REFERENCE TO RELATED APPLICATIONS

The present application is a national stage of International Application No. PCT/CN2019/070182 filed on Jan. 3, 2019, the disclosure of which is hereby incorporated by reference in its entirety.

TECHNICAL FIELD

The present disclosure relates to the field of communication technologies, and in particular to a channel detection method and apparatus.

BACKGROUND

In a new generation communication system, a flexible configuration supporting multiple service types is needed, where different service types correspond to different service requirements. For example, major requirements of an enhanced Mobile Broad Band (eMBB) service type are large bandwidth and high rate; major requirements of an Ultra Reliable Low Latency Communication (URLLC) service type are high reliability and low latency; and major requirements of a massive Machine Type Communication (mMTC) service type are a large number of connections. Therefore, driving by the service requirements, only using licensed spectrum cannot meet more service requirements in the new generation communication system.

In related art, for a cellular mobile communication system operating on an unlicensed spectrum, after a base station successfully detects and occupies a channel through the channel detection, there can be multiple switching points for uplink and downlink transmission within a channel occupation duration of the base station, so as to support service types that are sensitive to latency.

However, the related art does not specify what channel detection mechanism should be used for a subsequent downlink transmission when a scheduled uplink transmission is not successfully performed.

SUMMARY

To solve the problems of the related art, examples of the present disclosure provide a channel detection method and apparatus.

According to a first aspect of the embodiments of the present disclosure, a channel detection method is provided, which is applied to a base station operating on an unlicensed spectrum. The method includes:
- detecting that a first uplink transmission is not successfully performed;
- determining a target channel detection mechanism for performing channel detection for a first downlink transmission, wherein the first downlink transmission represents a next downlink transmission following the first uplink transmission;
- performing the channel detection for the first downlink transmission based on the target channel detection mechanism.

Optionally, determining the target channel detection mechanism for performing the channel detection for the first downlink transmission includes:
determining that the target channel detection mechanism is a first channel detection mechanism, and a channel occupation priority of the first channel detection mechanism is a low priority;
performing the channel detection for the first downlink transmission based on the target channel detection mechanism includes:
performing the channel detection for the first downlink transmission based on the first channel detection mechanism.

Optionally, the first channel detection mechanism includes a listen before talk category 4 (LBT CAT4) mechanism.

Optionally, the method further includes:
sending occupancy indication information corresponding to the first uplink transmission at a first designated position before the first uplink transmission, the occupancy indication information indicates that a wireless channel corresponding to the first uplink transmission has been occupied.

Optionally, the occupancy indication information includes a channel occupancy duration of the first uplink transmission.

Optionally, determining the target channel detection mechanism for performing the channel detection for the first downlink transmission includes:
determining that the target channel detection mechanism is not to perform the channel detection or the target channel detection mechanism is a second channel detection mechanism, wherein an occupation priority of the second channel detection mechanism is a high priority;
performing the channel detection for the first downlink transmission based on the target channel detection mechanism includes:
in response to that the target channel detection mechanism is not to perform the channel detection, not performing the channel detection for the first downlink transmission;
in response to that the target channel detection mechanism is the second channel detection mechanism, performing the channel detection for the first downlink transmission based on the second channel detection mechanism.

Optionally, the second channel mechanism includes a listen before talk category 2 (LBT CAT2) mechanism.

Optionally, the method further includes:
sending a downlink signal for occupying a channel at a second designated position of the first uplink transmission.

Optionally, determining the target channel detection mechanism for performing the channel detection for the first downlink transmission includes:
determining that the target channel detection mechanism is not to perform the channel detection or the target channel detection mechanism is a third channel detection mechanism, wherein an occupation priority of the third channel detection mechanism is a high priority;
performing the channel detection for the first downlink transmission based on the target channel detection mechanism includes:
in response to that the target channel detection mechanism is not to perform the channel detection, not performing the channel detection for the first downlink transmission;
in response to that the target channel detection mechanism is the third channel detection mechanism, performing the channel detection for the first downlink transmission based on the third channel detection mechanism.

Optionally, the third channel mechanism includes a listen before talk category 2 (LBT CAT2) mechanism.

According to a first aspect of the embodiments of the present disclosure, a channel detection apparatus is provided, which is applied to a base station operating on an unlicensed spectrum. The apparatus includes:
  a first detection module, configured to: detect that a first uplink transmission is not successfully performed;
  a determining module, configured to determine a target channel detection mechanism for performing channel detection for a first downlink transmission, wherein the first downlink transmission represents a next downlink transmission following the first uplink transmission;
  a second detection module, configured to perform the channel detection for the first downlink transmission based on the target channel detection mechanism.

Optionally, the determining module includes:
  a first determining sub-module, configured to determine that the target channel detection mechanism is a first channel detection mechanism, and a channel occupation priority of the first channel detection mechanism is a low priority;
the second detection module includes:
  a first detection sub-module, configured to perform the channel detection for the first downlink transmission based on the first channel detection mechanism.

Optionally, the first channel detection mechanism includes a listen before talk category 4 (LBT CAT4) mechanism.

Optionally, the apparatus further includes:
  a first sending module, configured to send occupancy indication information corresponding to the first uplink transmission at a first designated position before the first uplink transmission, the occupancy indication information indicates that a wireless channel corresponding to the first uplink transmission has been occupied.

Optionally, the occupancy indication information includes a channel occupancy duration of the first uplink transmission.

Optionally, the determining module includes:
  a second determining module, configured to determine that the target channel detection mechanism is not to perform the channel detection or the target channel detection mechanism is a second channel detection mechanism, wherein an occupation priority of the second channel detection mechanism is a high priority;
the second detection module includes:
  a second detection sub-module, configured to in response to that the target channel detection mechanism is not to perform the channel detection, not perform the channel detection for the first downlink transmission;
  a third detection module, configured to in response to that the target channel detection mechanism is the second channel detection mechanism, perform the channel detection for the first downlink transmission based on the second channel detection mechanism.

Optionally, the second channel mechanism includes a listen before talk category 2 (LBT CAT2) mechanism.

Optionally, the apparatus further includes:
  a second sending module, configured to send a downlink signal for occupying a channel at a second designated position of the first uplink transmission.

Optionally, the determining module includes:
  a third determining sub-module, configured to determine that the target channel detection mechanism is not to perform the channel detection or the target channel detection mechanism is a third channel detection mechanism, wherein an occupation priority of the third channel detection mechanism is a high priority;
the second detection module includes:

a fourth detection sub-module, configured to in response to that the target channel detection mechanism is not to perform the channel detection, not perform the channel detection for the first downlink transmission;
  a fifth detection sub-module, configured to in response to that the target channel detection mechanism is the third channel detection mechanism, perform the channel detection for the first downlink transmission based on the third channel detection mechanism.

Optionally, the third channel mechanism includes a listen before talk category 2 (LBT CAT2) mechanism.

According to a third aspect of the embodiments of the present disclosure, there is provided a non-transitory computer readable storage medium having a computer program stored thereon, where the computer program is configured for executing a channel detection method according to the first aspect.

According to a fourth aspect of the embodiments of the present disclosure, a channel detection apparatus is provided, which is applied to a base station operating on an unlicensed spectrum. The apparatus includes:
  a processor, and
  memory for storing instructions executable by the processor;
  wherein the processor is configured to:
  detect that a first uplink transmission is not successfully performed;
  determine a target channel detection mechanism for performing channel detection for a first downlink transmission, wherein the first downlink transmission represents a next downlink transmission following the first uplink transmission;
  perform the channel detection for the first downlink transmission based on the target channel detection mechanism.

The technical solutions provided by an example of the present disclosure may include the following beneficial effects.

In the based station of the present disclosure, when it is detected that the first uplink transmission is not successfully performed, the target channel detection mechanism for channel detection of the first downlink transmission can be determined first, and the first downlink transmission represents the first uplink transmission. For the next downlink transmission following transmission, the channel detection is performed on the first downlink transmission according to the target channel detection mechanism, so that the base station can specifically select which channel detection mechanism to use according to the actual situation, thereby improving the accuracy and efficiency of the channel detection.

It is understood that the above general descriptions and subsequent detailed descriptions are merely illustrative and explanatory and shall not constitute limitations to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
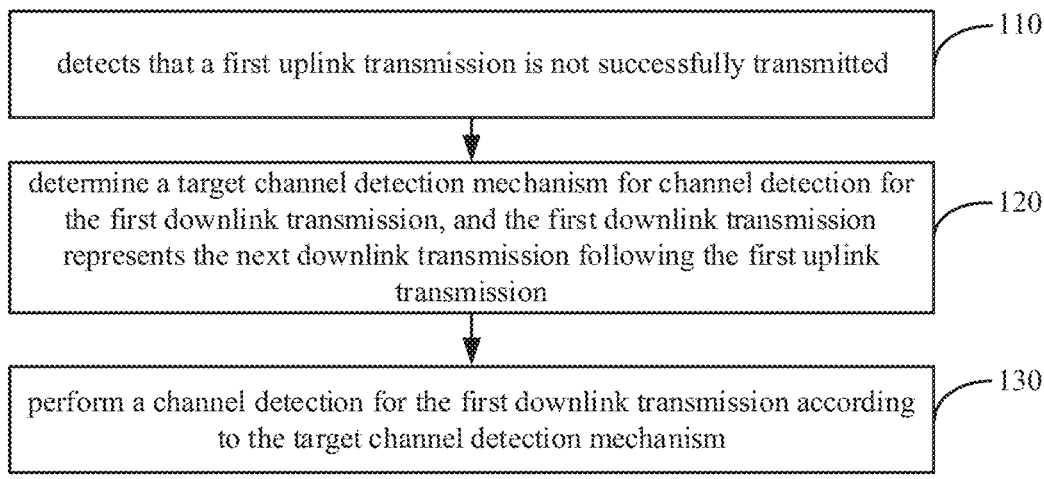
FIG. 1 is a flowchart illustrating a channel detection method according to an example.

Embodiments will be described in detail herein with the examples thereof expressed in the drawings. When the following descriptions involve the drawings, like numerals in different drawings represent like or similar elements unless stated otherwise. The embodiments described in the following examples do not represent all embodiments consistent with the present disclosure. Rather, they are merely examples of apparatuses and methods consistent with some aspects of the present disclosure as detailed in the appended claims.

The term used in the present disclosure is for the purpose of describing particular examples only and is not intended to limit the present disclosure. As used in this disclosure and the appended claims, the singular forms "a", "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

Figure 2:
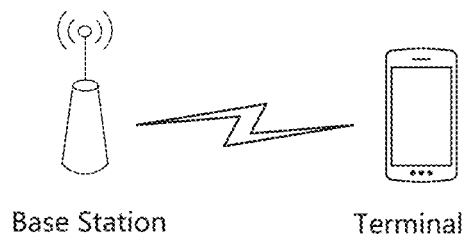
FIG. 2 is an application scenario diagram illustrating a channel detection according to an example.

FIG. 1 is a flowchart illustrating a channel detection method according to an example. FIG. 2 is an application scenario diagram illustrating a channel detection according to an example. The channel detection can be applied in a station operating on an unlicensed spectrum. As shown in FIG. 1, the channel detection method may include the following steps 110-130.

At step 110, it is detected that a first uplink transmission is not successfully performed.

In the embodiments of the present disclosure, for a cellular mobile communication system operating on an unlicensed spectrum, after the base station successfully performs channel detection and occupies a channel, there may be multiple switching points for uplink and downlink transmission within a channel occupation time of the base station, so as to support service types that are more sensitive to delay.

Figure 2A:
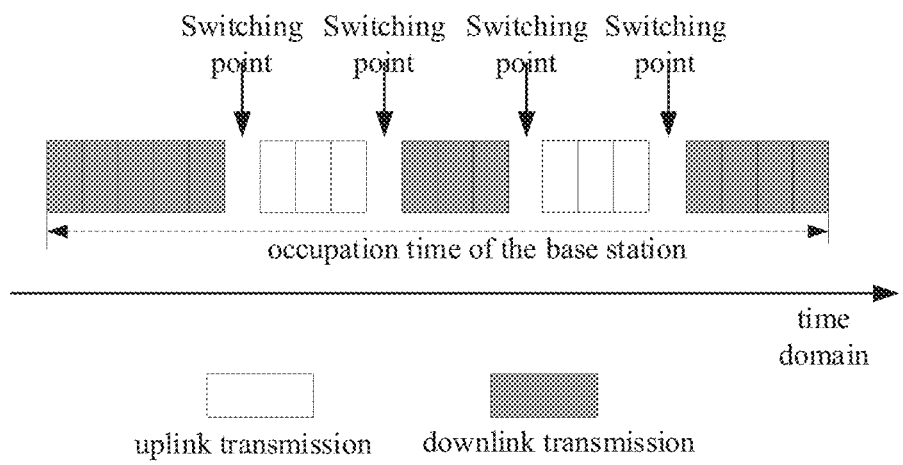
FIG. 2A is a schematic diagram illustrating a channel detection according to an example.
Figure 2B:
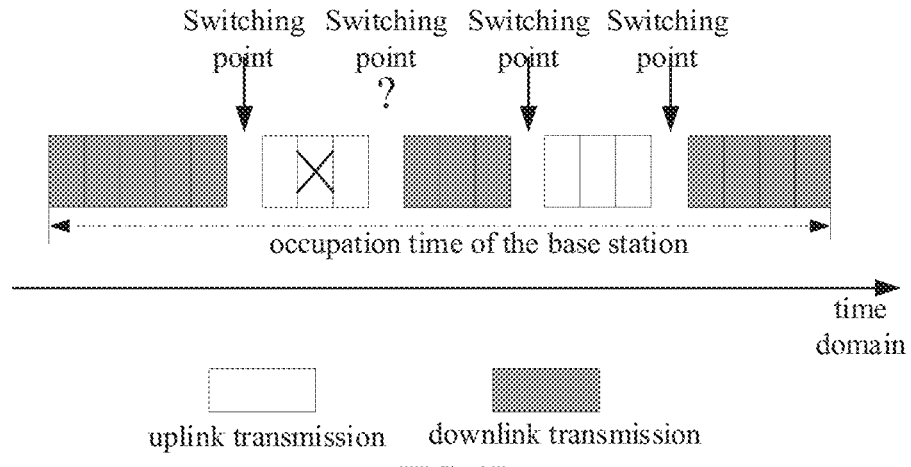
FIG. 2B is a schematic diagram illustrating another channel detection according to an example.

The first uplink transmission may be within the channel occupation time of the base station, and the channel occupation time of the base station may include multiple switching points for uplink and downlink transmission. As shown in FIG. 2A, the first uplink transmission may refer to any uplink transmission in FIG. 2A. For example, if it is detected that the first uplink transmission in FIG. 2A is not successfully performed, as shown in FIG. 2B, it is necessary to determine what channel detection mechanism should be used.

At step 120, a target channel detection mechanism for channel detection for the first downlink transmission is determined, and the first downlink transmission represents the next downlink transmission following the first uplink transmission.

In the embodiments of the present disclosure, when determining the target channel detection mechanism, the base station can specifically select which channel detection mechanism to use according to actual conditions.

Figure 3:
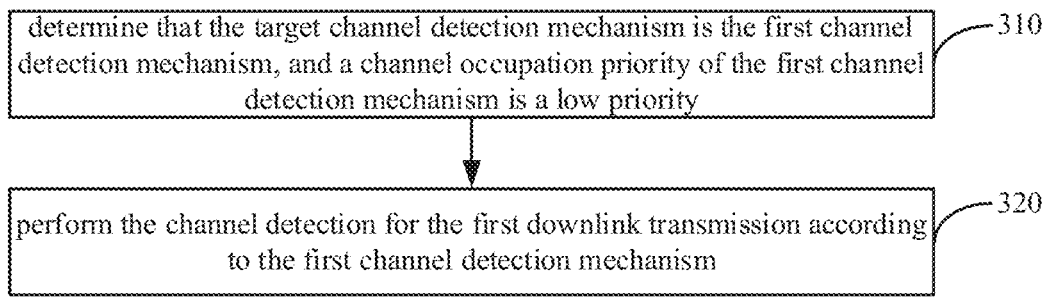
FIG. 3 is a flowchart illustrating another channel detection method according to an example.

For example, in order to not require additional signaling overhead, a channel detection mechanism with a lower channel occupation priority can be used. The specific implementation process is shown in FIG. 3.

Figure 4:
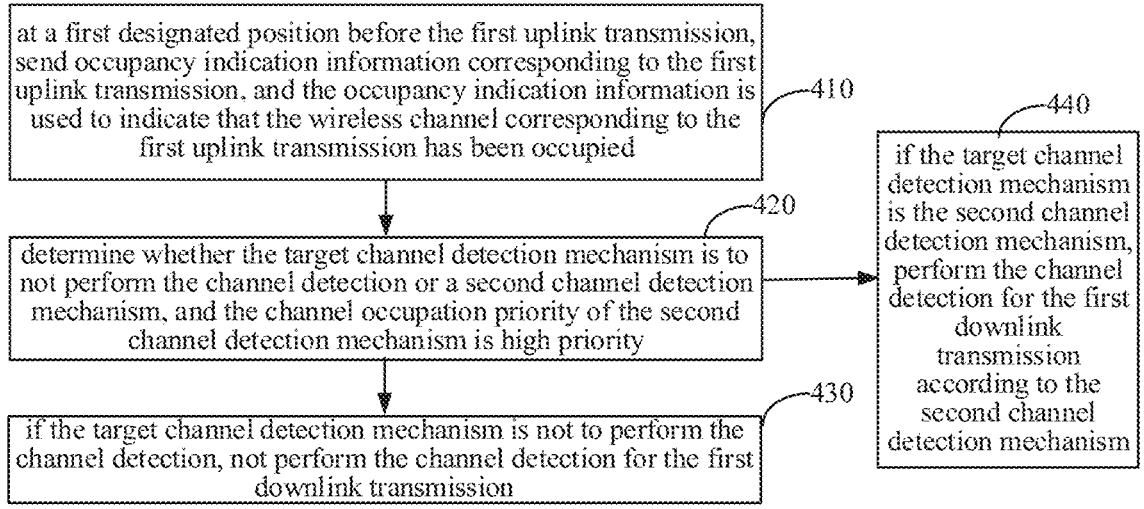
FIG. 4 is a flowchart illustrating another channel detection method according to an example.

For another example: in order to reduce the probability of other nodes occupying the channel, occupancy indication information can be sent in advance, and the specific implementation process is shown in FIG. 4.

Figure 5:
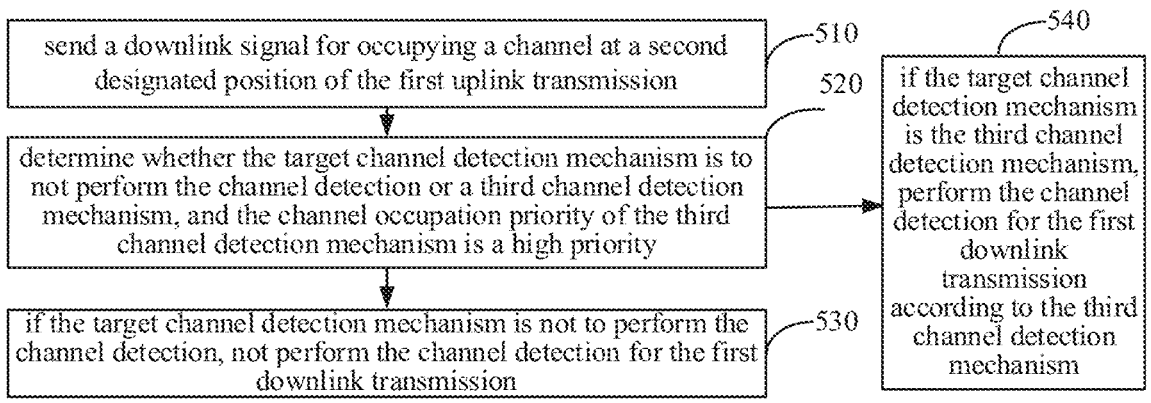
FIG. 5 is a flowchart illustrating another channel detection method according to an example.

For another example, in order to prevent other nodes from occupying the channel, a downlink signal for occupying the channel can be sent. The specific implementation process is shown in FIG. 5.

At step 130, a channel detection is performed on the first downlink transmission according to the target channel detection mechanism.

In an exemplary scenario, as shown in FIG. 2, the scenario includes a base station operating on an unlicensed spectrum and a terminal. When the base station detects that the first uplink transmission is not successfully performed, it will first determine the target channel detection mechanism for channel detection of the first downlink transmission. The first downlink transmission represents the next one after the first uplink transmission, then the channel detection is performed on the first downlink transmission according to the determined target channel detection mechanism.

It can be seen from the above embodiment that when it is detected that the first uplink transmission is not successfully performed, the target channel detection mechanism for channel detection of the first downlink transmission can be determined first, where the first downlink transmission represents the first uplink transmission. For the next downlink transmission following transmission, the channel detection is performed on the first downlink transmission according to the target channel detection mechanism, so that the base station can specifically select which channel detection mechanism to use according to the actual situation, thereby improving the accuracy and efficiency of the channel detection.

Figure 3A:
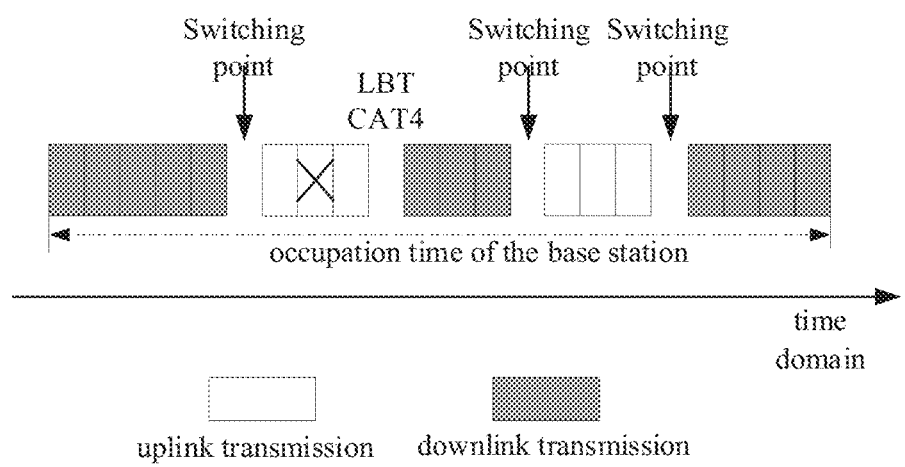
FIG. 3A is a schematic diagram illustrating another channel detection according to an example.

FIG. 3 is a flowchart illustrating another channel detection method according to an example. FIG. 3A is a schematic diagram illustrating another channel detection according to an example. The channel detection method can be applied in a base station operating on an unlicensed spectrum and established on a basis of the method shown in FIG. 1. When performing step 120, as shown in FIG. 3, the following step 310 can be included.

At step 310, it is determined that the target channel detection mechanism is the first channel detection mechanism, and a channel occupation priority of the first channel detection mechanism is a low priority. The target channel detection mechanism is a channel detection mechanism used to perform channel detection for the first downlink transmission after the first uplink transmission.

In an embodiment, the first channel detection mechanism of which the channel occupation priority is a low priority in step 310 may include an LBT (listen before talk) CAT (category) 4 mechanism.

In addition, the channel detection mechanism of LBT CAT4 is based on CCA (clear channel assessment) with random backoff. The base station can generate a backoff counter N uniformly and randomly between 0~CWS (contention window size), and listen with a CCA slot as the granularity. If the channel is detected to be idle in the CCA slot, the back-off counter may be decremented by 1, otherwise the backoff counter may be suspended if the channel is detected to be busy, that is, the backoff counter N remains the same during a busy time of the channel until the channel is detected to be idle. When the back-off counter is reduced to 0, the base station can immediately occupy the channel. CWS is a dynamically adjusted value, and the base station dynamically adjusts the CWS according to whether the previous transmission is correctly received by a receiving node. In this way, an appropriate CWS value can be obtained by adjusting based on a channel state and a network traffic load, and a compromise can be achieved between reducing collisions among sending nodes and improving channel access efficiency.

In an example, corresponding to step 310, when performing step 130, as shown in FIG. 3, the method may include the following step 320.

At step 320, the channel detection is performed on the first downlink transmission according to the first channel detection mechanism. The first downlink transmission represents the next downlink transmission following the first uplink transmission.

In the embodiments of the present disclosure, the first channel detection mechanism may specifically be the LBT CAT4 mechanism. As shown in FIG. 3A, for the first downlink transmission after the first uplink transmission that was not successfully performed, channel detection can be performed on the downlink transmission according to the LBT CAT4 mechanism.

It can be seen from the above embodiment that when determining the target channel detection mechanism for performing channel detection for the first downlink transmission, additional signaling overhead may not be needed, and the channel detection mechanism with a channel occupation priority of low priority may be directly used as the target channel detection mechanism. As the channel detection for the first downlink transmission is performed according to the first channel detection mechanism, thereby meeting the individual needs of the base station for channel detection and improving the practicability of channel detection.

Figure 4A:
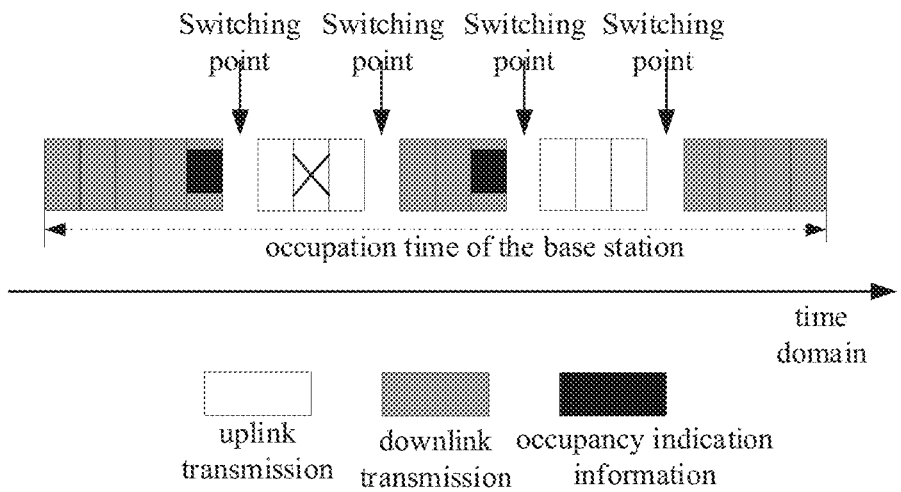
FIG. 4A is a schematic diagram illustrating another channel detection according to an example.

FIG. 4 is a flowchart illustrating another channel detection method according to an example. FIG. 4A is a schematic diagram illustrating another channel detection according to an example. The channel detection method can be applied in a base station operating on an unlicensed spectrum and established on a basis of the method shown in FIG. 1. As shown in FIG. 4, the channel detection method can further include the following step 410:

At step 410, at a first designated position before the first uplink transmission, occupancy indication information corresponding to the first uplink transmission is sent, and the occupancy indication information indicates that a wireless channel corresponding to the first uplink transmission has been occupied.

In the embodiments of the present disclosure, the first designated position may be a predefined position, which may be as close as possible to the position of the first uplink transmission. For example, as shown in FIG. 4A, the first designated position is the position where the last symbol of the downlink transmission before the first uplink transmission is located.

In addition, when scheduling each uplink transmission (including the first uplink transmission), the base station can send the occupancy indication information corresponding to each uplink transmission at a predefined position before each uplink transmission. The purpose of sending the respective occupancy indication information is to indicate that the wireless channel is occupied before the end of the uplink transmission.

In an embodiment, the occupancy indication information in step 410 may include the channel occupancy duration of the first uplink transmission.

In an example, corresponding to step 410, when performing step 120, as shown in FIG. 4, the method may include the following step 420.

At step 420, it is determined whether the target channel detection mechanism is not to perform the channel detection or the target channel detection mechanism is a second channel detection mechanism, and the channel occupation priority of the second channel detection mechanism is a high priority. The target channel detection mechanism is a channel detection mechanism used to perform channel detection for the first downlink transmission after the first uplink transmission.

In the embodiments of the present disclosure, after the base station sends the occupancy indication information corresponding to the first uplink transmission at the first designated position before the first uplink transmission, it may not perform the channel detection for the first downlink transmission after the first uplink transmission or perform the channel detection according to the second channel detection mechanism of which the channel occupation priority is a high priority.

In an embodiment, in step 420, the second channel detection mechanism of which the channel occupation priority is a high priority may include the LBT CAT2 mechanism.

As for the situation under which the target channel detection mechanism does not perform channel detection, and under which situation it is the second channel detection mechanism, this is determined by an interval between the first uplink transmission and the first downlink transmission. The interval between the first uplink transmission and the first downlink transmission may refer to a time interval between the end position of the first uplink transmission scheduled by the base station and the start position of the first downlink transmission.

For example: when the interval between the first uplink transmission and the first downlink transmission is less than or equal to 16 microseconds, the first downlink transmission may not perform channel detection; when the interval between the first uplink transmission and the first downlink transmission is greater than 16 microseconds and less than 25 microseconds, the first downlink transmission needs to perform the channel detection according to the LBT CAT2 mechanism.

In addition, for the channel detection mechanism of LBT CAT2, the specific process is: the base station first performs a single-slot CCA listening, if it is detected that during the CCA time slot, the channel is idle, the base station can immediately access the channel; if it is detected that during the CCA time slot, the channel is busy, the base station waits for the next CCA time slot to listen again, and can access the channel immediately when the channel is idle.

In an embodiment, corresponding to step 420, when performing step 130, as shown in FIG. 4, the following steps 430-440 may be included:

At step 430, if the target channel detection mechanism is not to perform the channel detection, the channel detection is not performed on the first downlink transmission.

At step 440, if the target channel detection mechanism is the second channel detection mechanism, the channel detection is performed on the first downlink transmission according to the second channel detection mechanism.

In the embodiment of the present disclosure, the second channel detection mechanism may specifically be the LBT CAT2 mechanism. As shown in FIG. 4A, for the first downlink transmission after the first uplink transmission that was not successfully performed, when the interval between the first uplink transmission and the first downlink transmission is less than or equal to 16 microseconds, the channel detection is not performed on the first downlink transmission; and, when the interval between the first uplink transmission and the first downlink transmission is greater than 16 microseconds and less than 25 microseconds, the channel detection can be performed on the first downlink transmission according to the LBT CAT2 mechanism.

It can be seen from the above embodiment that by sending the occupancy indication information corresponding to the first uplink transmission at a first designated position before the first uplink transmission, when performing the channel detection, the channel detection may not be performed on the first downlink transmission after the first uplink transmission, or the target channel detection mechanism is a second channel detection mechanism may be adopted, thereby reducing the probability of other nodes preempting the channel and improving the efficiency of channel detection.

Figure 5A:
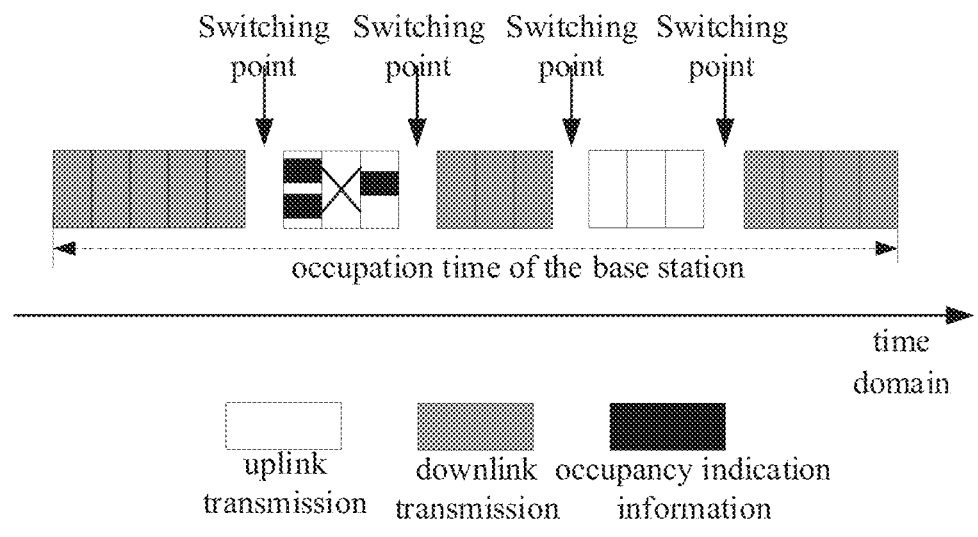
FIG. 5A is a schematic diagram illustrating another channel detection according to an example.

FIG. 5 is a flowchart illustrating another channel detection method according to an example. FIG. 5A is a schematic diagram illustrating another channel detection according to an example. The channel detection method can be applied in a base station operating on an unlicensed spectrum and established on a basis of the method shown in FIG. 1. Detecting that a first uplink transmission is not successfully performed may include the base station detects that no uplink data is received at a time-frequency resource position of the scheduled first uplink transmission within a predefined period of time. As shown in FIG. 5, the channel detection method may include the following step 510.

At step 510, a downlink signal for occupying a channel is sent at a second designated position of the first uplink transmission.

In the embodiments of the present disclosure, the second designated position may be a predefined position, such as the position where the downlink signal is located as shown in FIG. 5A. In addition, the downlink signal sent at the second designated position of the first uplink transmission is used to occupy a wireless channel corresponding to the first uplink transmission.

Furthermore, when scheduling each uplink transmission (including the first uplink transmission), the base station can send the downlink signal for occupying the channel at the second designated position of each uplink transmission; the base station can also only send the downlink signal for occupying the channel at the second designated position of the first uplink transmission that has not been successfully performed. For example, when the base station detects that no uplink data is received at a time-frequency resource position of the scheduled first uplink transmission within a predefined period of time, the base station may send a downlink signal to occupy the channel, and the sent downlink signal can be used for channel quality measurement, mobility management measurement, etc.

In an embodiment, corresponding to step 510, when performing step 120, as shown in FIG. 5, the following step 520 may be included.

At step 520, it is determined whether the target channel detection mechanism is not to perform the channel detection or the target channel detection mechanism is a third channel detection mechanism, and the channel occupation priority of the third channel detection mechanism is a high priority. The target channel detection mechanism is a channel detection mechanism used to perform channel detection for the first downlink transmission after the first uplink transmission.

In the embodiments of the present disclosure, after the base station sends a downlink signal for occupying a channel at the second designated position of the first uplink transmission, it may not perform the channel detection for the first downlink transmission after the first uplink transmission or perform the channel detection according to the third channel detection mechanism of which the channel occupation priority is a high priority.

In an embodiment, in step 520, the third channel detection mechanism of which the channel occupation priority is a high priority may include the LBT CAT2 mechanism.

As for the situation under which the target channel detection mechanism does not perform channel detection, and under which situation it is the third channel detection mechanism, this is determined by an interval between the first uplink transmission and the first downlink transmission. The interval between the first uplink transmission and the first downlink transmission may refer to a time interval between the end position of the first uplink transmission scheduled by the base station and the start position of the first downlink transmission.

For example: when the interval between the first uplink transmission and the first downlink transmission is less than or equal to 16 microseconds, the first downlink transmission may not perform channel detection; when the interval between the first uplink transmission and the first downlink transmission is greater than 16 microseconds and less than 25 microseconds, the first downlink transmission needs to perform the channel detection according to the LBT CAT2 mechanism.

In addition, for the channel detection mechanism of LBT CAT2, the specific process is: the base station first performs a single-slot CCA listening, if it is detected that during the CCA time slot, the channel is idle, the base station can immediately access the channel; if it is detected that during the CCA time slot, the channel is busy, the base station waits for the next CCA time slot to listen again, and can access the channel immediately when the channel is idle.

In an embodiment, corresponding to step 520, when performing step 130, as shown in FIG. 5, the following steps 530-540 may be included:

At step 530, if the target channel detection mechanism is not to perform the channel detection, the channel detection is not performed on the first downlink transmission.

At step 540, if the target channel detection mechanism is the third channel detection mechanism, the channel detection is performed on the first downlink transmission according to the third channel detection mechanism.

In the embodiment of the present disclosure, the third channel detection mechanism may specifically be a LBT CAT2 mechanism. As shown in FIG. 5A, for the first downlink transmission after the first uplink transmission that was not successfully performed, when the interval between the first uplink transmission and the first downlink transmission is less than or equal to 16 microseconds, the channel detection is not performed on the first downlink transmission; and, when the interval between the first uplink transmission and the first downlink transmission is greater than 16 microseconds and less than 25 microseconds, the channel detection can be performed on the first downlink transmission according to the LBT CAT2 mechanism.

It can be seen from the above embodiment that the downlink signal for occupying the channel is sent at the second designated position of the first uplink transmission, so that when performing the channel detection, the channel detection may not be performed on the first downlink transmission after the first uplink transmission, or a third channel detection mechanism may be adopted, which prevents other nodes from occupying the channel and also improves the efficiency of channel detection.

Corresponding to the embodiments of channel detection method, the present disclosure further provides embodiments of channel detection apparatus. In addition, for parts that are not described in detail in the embodiment of the channel detection apparatus, reference may be made to the embodiment of the corresponding channel detection method.

Figure 6:
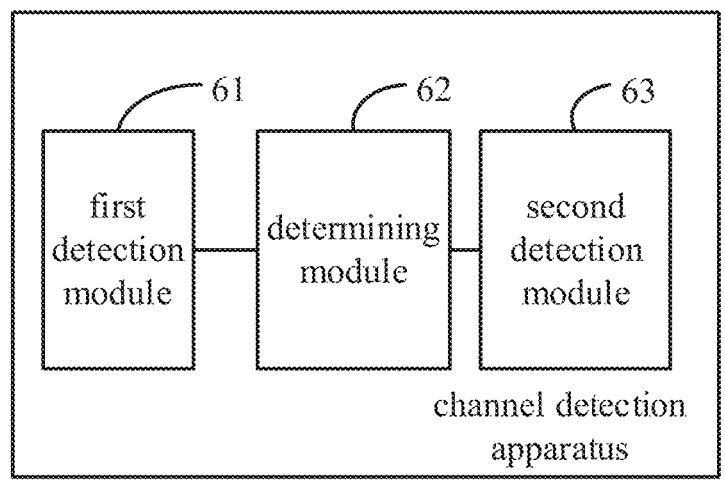
FIG. 6 is a block diagram illustrating a channel detection apparatus according to an example.

FIG. 6 is a block diagram illustrating a channel detection apparatus according to an example. The apparatus is applied to a base station operating on an unlicensed spectrum, and is configured to perform the channel detection method as shown in FIG. 1. As shown FIG. 6, the channel detection apparatus may include:

a first detection module 61, configured to: detect that a first uplink transmission is not successfully performed;

a determining module 62, configured to determine a target channel detection mechanism for performing channel detection for a first downlink transmission, wherein the first downlink transmission represents a next downlink transmission following the first uplink transmission;

a second detection module 63, configured to perform the channel detection for the first downlink transmission based on the target channel detection mechanism.

It can be seen from the above embodiment that when it is detected that the first uplink transmission is not successfully performed, the target channel detection mechanism for channel detection of the first downlink transmission can be determined first, and the first downlink transmission is used to characterize the first uplink transmission. For the next downlink transmission following transmission, the channel detection is performed on the first downlink transmission according to the target channel detection mechanism, so that the base station can specifically select which channel detection mechanism to use according to the actual situation, thereby improving the accuracy and efficiency of the channel detection.

Figure 7:
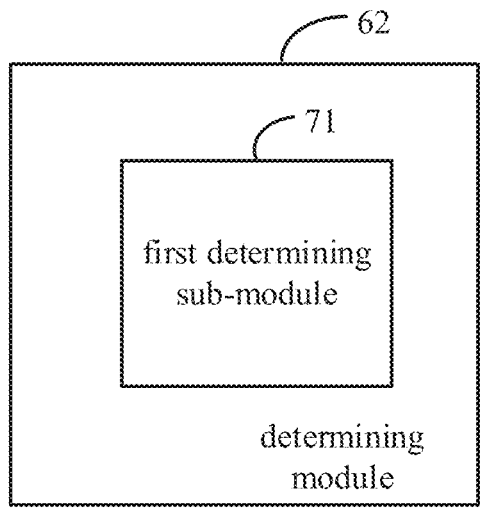
FIG. 7 is a block diagram illustrating another channel detection apparatus according to an example.
Figure 8:
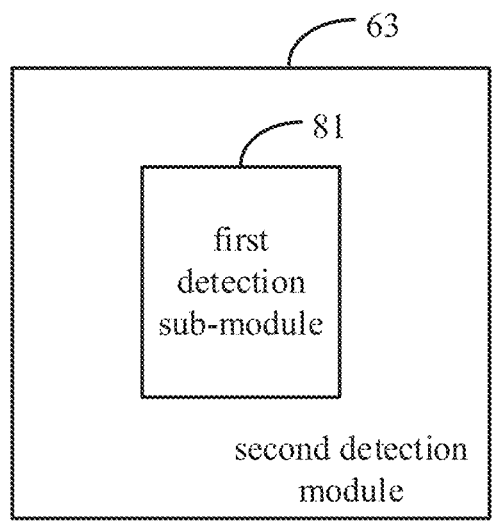
FIG. 8 is a block diagram illustrating another channel detection apparatus according to an example.

In an embodiment, based on the apparatus shown in FIG. 6, as shown in FIG. 7, the determining module 62 may include:

a first determining sub-module 71, configured to determine that the target channel detection mechanism is a first channel detection mechanism, and a channel occupation priority of the first channel detection mechanism is a low priority;

As shown in FIG. 8, the second detection module 63 may include:

a first detection sub-module 81, configured to perform the channel detection for the first downlink transmission based on the first channel detection mechanism.

In an embodiment, based on the apparatus shown in FIG. 7 or FIG. 8, the first channel mechanism includes a listen before talk category 4 (LBT CAT4) mechanism.

It can be seen from the above embodiment that when determining the target channel detection mechanism for performing channel detection for the first downlink transmission, additional signaling overhead may not be needed, and the channel detection mechanism with a channel occupation priority of low priority may be directly used as the target channel detection mechanism. As the channel detection for the first downlink transmission is performed according to the first channel detection mechanism, thereby meeting the individual needs of the base station for channel detection and improving the practicability of channel detection.

Figure 9:
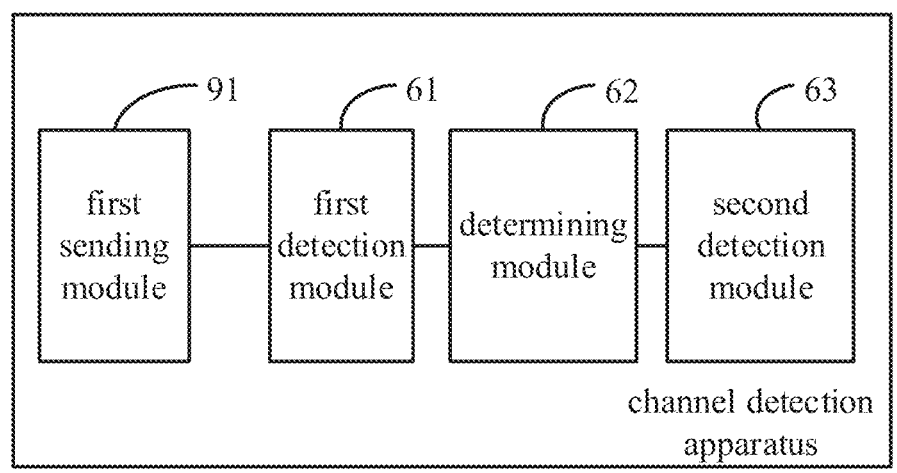
FIG. 9 is a block diagram illustrating another channel detection apparatus according to an example.

In an embodiment, based on the apparatus shown in FIG. 6, as shown FIG. 9, the apparatus may also include:

a first sending module 91, configured to send occupancy indication information corresponding to the first uplink transmission at a first designated position before the first uplink transmission, the occupancy indication information indicates that a wireless channel corresponding to the first uplink transmission has been occupied.

Figure 10:
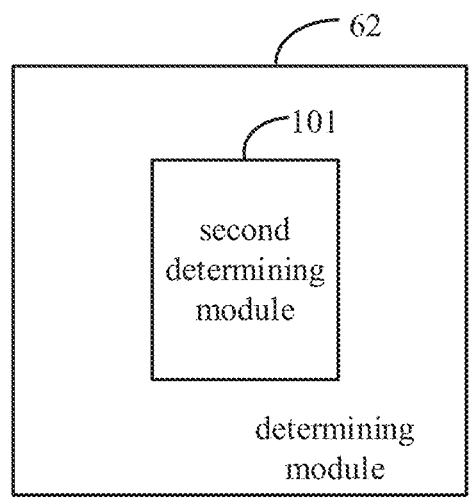
FIG. 10 is a block diagram illustrating another channel detection apparatus according to an example.

In an embodiment, based on the device shown in FIG. 9, as shown in FIG. 10, the occupancy indication information includes a channel occupancy duration of the first uplink transmission.

Figure 11:
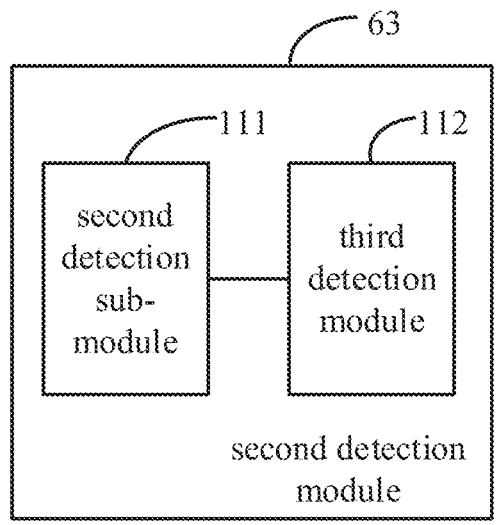
FIG. 11 is a block diagram illustrating another channel detection apparatus according to an example.

In an embodiment, based on the apparatus shown in FIG. 8 or FIG. 9, as shown in FIG. 10, the determining module 62 may include:

a second determining module 101, configured to determine that the target channel detection mechanism is not to perform the channel detection or the target channel detection mechanism is a second channel detection mechanism, wherein an occupation priority of the second channel detection mechanism is a high priority;

As shown in FIG. 11, the second detection module 63 may include:

a second detection sub-module 111, configured to in response to that the target channel detection mechanism is not to perform the channel detection, not perform the channel detection for the first downlink transmission;

a third detection module 112, configured to in response to that the target channel detection mechanism is the second channel detection mechanism, perform the channel detection for the first downlink transmission based on the second channel detection mechanism.

In an embodiment, based on the apparatus shown in FIG. 10 or FIG. 11, the second channel mechanism includes a listen before talk category 2 (LBT CAT2) mechanism.

Figure 12:
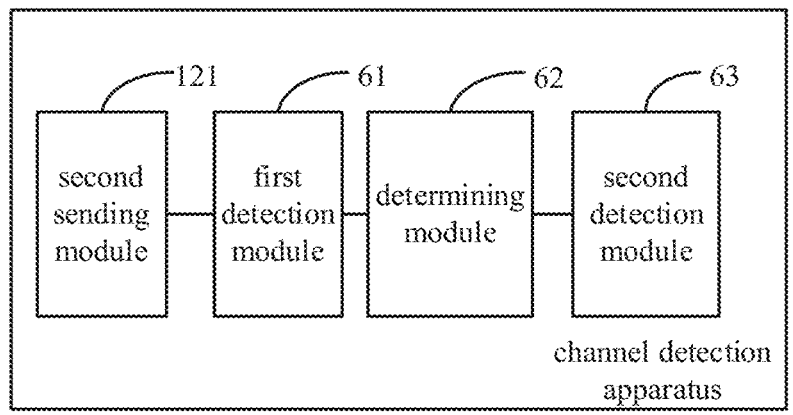
FIG. 12 is a block diagram illustrating another channel detection apparatus according to an example.

In an embodiment, based on the apparatus shown in FIG. 6, as shown FIG. 12, the apparatus may also include:

a second sending module 121, configured to send a downlink signal for occupying a channel at a second designated position of the first uplink transmission.

It can be seen from the above embodiment that by sending the occupancy indication information corresponding to the first uplink transmission at a first designated position before the first uplink transmission, when performing the channel detection, the channel detection may not be performed on the first downlink transmission after the first uplink transmission, or a second channel detection mechanism may be adopted, thereby reducing the probability of other nodes preempting the channel and improving the efficiency of channel detection.

Figure 13:
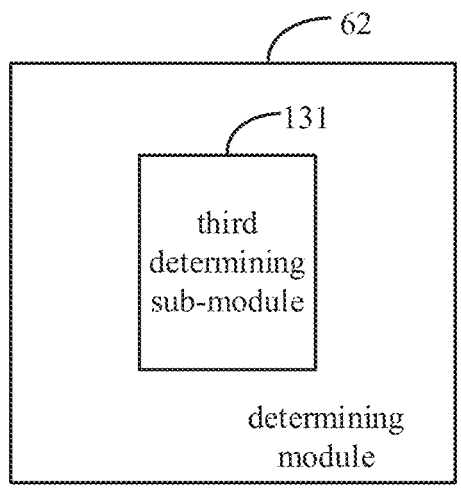
FIG. 13 is a block diagram illustrating another channel detection apparatus according to an example.
Figure 14:
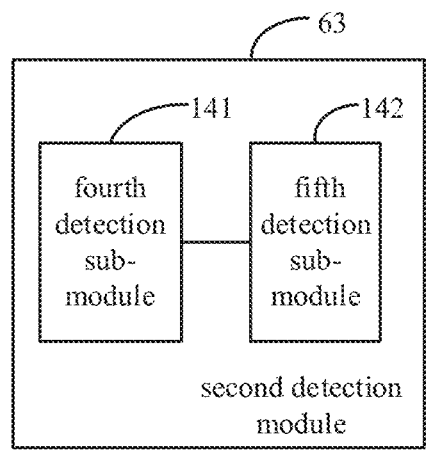
FIG. 14 is a block diagram illustrating another channel detection apparatus according to an example.

In an embodiment, based on the apparatus shown in FIG. 12, as shown in FIG. 13, the determining module 62 may include:

a third determining sub-module 131, configured to determine that the target channel detection mechanism is not to perform the channel detection or the target channel detection mechanism is a third channel detection mechanism, wherein an occupation priority of the third channel detection mechanism is a high priority;

As shown in FIG. 14, the second detection module 63 may include:

a fourth detection sub-module 141, configured to in response to that the target channel detection mechanism is not to perform the channel detection, not perform the channel detection for the first downlink transmission;

a fifth detection sub-module 142, configured to in response to that the target channel detection mechanism is the third channel detection mechanism, perform the channel detection for the first downlink transmission based on the third channel detection mechanism.

In an embodiment, based on the apparatus shown in FIG. 13 or FIG. 14, the third channel mechanism includes a listen before talk category 2 (LBT CAT2) mechanism.

It can be seen from the above embodiment that the downlink signal for occupying the channel is sent at the second designated position of the first uplink transmission, so that when performing the channel detection, the channel detection may not be performed on the first downlink transmission after the first uplink transmission, or the target channel detection mechanism is a third channel detection mechanism may be adopted, which prevents other nodes from occupying the channel and also improves the efficiency of channel detection.

Since the apparatus examples substantially correspond to the method examples, a reference may be made to part of the descriptions of the method examples for the related part. The apparatus examples described above are merely illustrative, wherein the units described as separate components may or may not be physically separated, and the components displayed as units may or may not be physical units, i.e., may be located in one place or may be distributed to multiple network units. Part or all of the modules may be selected according to actual requirements to implement the objectives of the solutions in the examples. Those of ordinary skill in the art may understand and carry out them without creative work.

Correspondingly, the present disclosure further provides a non-transitory computer readable storage medium having a computer program stored thereon, where the computer program is configured for executing a channel detection method according to any of FIGS. 1-5.

Correspondingly, the present disclosure also provides a channel detection apparatus, which is applied to a base station operating on an unlicensed spectrum, and the apparatus includes:

a processor, and memory for storing instructions executable by the processor;

wherein the processor is configured to:

detect that a first uplink transmission is not successfully performed;

determine a target channel detection mechanism for performing channel detection for a first downlink transmission, wherein the first downlink transmission is configured to characterize a next downlink transmission following the first uplink transmission;

perform the channel detection for the first downlink transmission based on the target channel detection mechanism.

Figure 15:
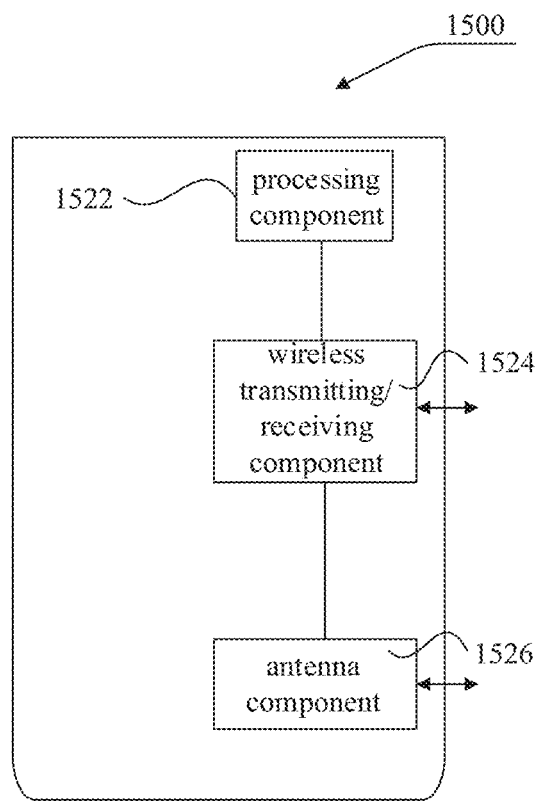
FIG. 15 is a schematic structural diagram illustrating a channel detection apparatus according to an example.

As shown in FIG. 15, which is a schematic structural diagram illustrating a channel detection apparatus according to an example. The apparatus 1500 may be provided as a base station operating on an unlicensed spectrum. Referring to FIG. 15, the apparatus 1500 includes a processing component 1522, a wireless transmitting/receiving component 1524, an antenna component 1526, and a signal processing portion specific to a wireless interface. The processing component 1522 may further include one or more processors.

One of the processors in the processing component 15222 may be configured to execute any one of the foregoing channel detection methods.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. A channel detection method, being applicable to a base station operating on an unlicensed spectrum, comprising:

detecting that a first uplink transmission is not successfully performed;

determining a target channel detection mechanism for performing channel detection for a first downlink transmission, wherein the first downlink transmission represents a next downlink transmission following the first uplink transmission; and performing the channel detection for the first downlink transmission based on the target channel detection mechanism;

wherein the method further comprises at least one of:

sending occupancy indication information corresponding to the first uplink transmission at a first designated position before the first uplink transmission, wherein the occupancy indication information indicates that a wireless channel corresponding to the first uplink transmission has been occupied, and the first designated position comprises a position where a last symbol of a downlink transmission before the first uplink transmission is located;

or sending a downlink signal for occupying a channel at a second designated position of the first uplink transmission, wherein the downlink signal is for occupying a wireless channel corresponding to the first uplink transmission, and the second designated position comprises at least one of a position where a first symbol of the first uplink transmission is located or a position where a last symbol of the first uplink transmission is located.

2. The method of claim 1, wherein said determining the target channel detection mechanism for performing the channel detection for the first downlink transmission comprises:

determining that the target channel detection mechanism is a first channel detection mechanism, wherein a channel occupation priority of the first channel detection mechanism is a low priority;

wherein said performing the channel detection for the first downlink transmission based on the target channel detection mechanism comprises:

performing the channel detection for the first downlink transmission based on the first channel detection mechanism.

3. The method of claim 2, wherein the first channel detection mechanism comprises a listen before talk category 4 (LBT CAT4) mechanism.

4. The method of claim 1, wherein the occupancy indication information comprises a channel occupancy duration of the first uplink transmission.

5. The method of claim 1, wherein said determining the target channel detection mechanism for performing the channel detection for the first downlink transmission comprises:

determining that the target channel detection mechanism is not to perform the channel detection or the target channel detection mechanism is a second channel detection mechanism, wherein an occupation priority of the second channel detection mechanism is a high priority;

wherein said performing the channel detection for the first downlink transmission based on the target channel detection mechanism comprises:

in response to that the target channel detection mechanism is not to perform the channel detection, not performing the channel detection for the first downlink transmission; or in response to that the target channel detection mechanism is the second channel detection mechanism, performing the channel detection for the first downlink transmission based on the second channel detection mechanism.

6. The method of claim 5, wherein the second channel mechanism comprises a listen before talk category 2 (LBT CAT2) mechanism.

7. The method of claim 1, wherein said determining the target channel detection mechanism for performing the channel detection for the first downlink transmission comprises:

determining that the target channel detection mechanism is not to perform the channel detection or the target channel detection mechanism is a third channel detection mechanism, wherein an occupation priority of the third channel detection mechanism is a high priority;

wherein said performing the channel detection for the first downlink transmission based on the target channel detection mechanism comprises:

in response to that the target channel detection mechanism is not to perform the channel detection, not performing the channel detection for the first downlink transmission; or in response to that the target channel detection mechanism is the third channel detection mechanism, performing the channel detection for the first downlink transmission based on the third channel detection mechanism.

8. The method of claim 7, wherein the third channel mechanism comprises a listen before talk category 2 (LBT CAT2) mechanism.

9. A communication system implementing the method of claim 1, comprising the base station, wherein the base station is configured to specifically select which channel detection mechanism to use according to an actual situation, thereby improving accuracy and efficiency of channel detection.

10. The communication system of claim 9, wherein the actual situation includes a requirement for no additional signaling overhead, and the channel detection mechanism selected has a lower channel occupation priority.

11. A non-transitory computer-readable storage medium storing a computer program, wherein the computer program is executed to perform:

detecting that a first uplink transmission is not successfully performed;

determining a target channel detection mechanism for performing channel detection for a first downlink transmission, wherein the first downlink transmission represents a next downlink transmission following the first uplink transmission; and performing the channel detection for the first downlink transmission based on the target channel detection mechanism;

wherein the computer program is further executed to perform at least one of:

sending occupancy indication information corresponding to the first uplink transmission at a first designated position before the first uplink transmission, wherein the occupancy indication information indicates that a wireless channel corresponding to the first uplink transmission has been occupied, and the first designated position comprises a position where a last symbol of a downlink transmission before the first uplink transmission is located;

or sending a downlink signal for occupying a channel at a second designated position of the first uplink transmission, wherein the downlink signal is for occupying a wireless channel corresponding to the first uplink transmission, and the second designated position comprises at least one of a position where a first symbol of the first uplink transmission is located or a position where a last symbol of the first uplink transmission is located.

12. A channel detection apparatus, applied to a base station operating on an unlicensed spectrum, comprising:
a processor, and
memory for storing instructions executable by the processor;
wherein the processor is configured to:
detect that a first uplink transmission is not successfully performed;
determine a target channel detection mechanism for performing channel detection for a first downlink transmission, wherein the first downlink transmission represents a next downlink transmission following the first uplink transmission;
perform the channel detection for the first downlink transmission based on the target channel detection mechanism;
wherein the processor is further configured to perform at least one of:

sending occupancy indication information corresponding to the first uplink transmission at a first designated position before the first uplink transmission, wherein the occupancy indication information indicates that a wireless channel corresponding to the first uplink transmission has been occupied, and the first designated position comprises a position where a last symbol of a downlink transmission before the first uplink transmission is located;
or
sending a downlink signal for occupying a channel at a second designated position of the first uplink transmission, wherein the downlink signal is for occupying a wireless channel corresponding to the first uplink transmission, and the second designated position comprises at least one of a position where a first symbol of the first uplink transmission is located or a position where a last symbol of the first uplink transmission is located.

* * * * *